(12) United States Patent
Lysov et al.

(10) Patent No.: US 12,276,545 B2
(45) Date of Patent: Apr. 15, 2025

(54) OPTOELECTRONIC SENSOR COMPONENT FOR MEASURING LIGHT WITH BUILT-IN REDUNDANCY

(71) Applicant: OSRAM Opto Semiconductors GmbH, Regensburg (DE)

(72) Inventors: Andrey Lysov, Regensburg (DE); Tim Boescke, Regensburg (DE)

(73) Assignee: OSRAM OPTO SEMICONDUCTORS GMBH, Regensburg (DE)

( * ) Notice: Subject to any disclaimer, the term of this patent is extended or adjusted under 35 U.S.C. 154(b) by 452 days.

(21) Appl. No.: 17/614,391

(22) PCT Filed: May 27, 2020

(86) PCT No.: PCT/EP2020/064678
§ 371 (c)(1),
(2) Date: Nov. 26, 2021

(87) PCT Pub. No.: WO2020/239825
PCT Pub. Date: Dec. 3, 2020

(65) Prior Publication Data
US 2022/0228908 A1 Jul. 21, 2022

(30) Foreign Application Priority Data
May 29, 2019 (DE) ...................... 10 2019 114 537.6

(51) Int. Cl.
*G01J 1/42* (2006.01)
*G01T 1/24* (2006.01)
*G01J 1/44* (2006.01)

(52) U.S. Cl.
CPC .......... *G01J 1/4204* (2013.01); *G01J 1/4228* (2013.01); *G01T 1/247* (2013.01); *G01J 2001/4233* (2013.01); *G01J 2001/446* (2013.01)

(58) Field of Classification Search
CPC .. G01J 1/4204; G01J 1/4228; G01J 2001/446; G01J 1/42; G01T 1/24;
(Continued)

(56) References Cited

U.S. PATENT DOCUMENTS 4,653,925 A * 3/1987 Thornton, Jr. .......... G01J 3/524
356/419
5,406,067 A 4/1995 Keller
(Continued)

FOREIGN PATENT DOCUMENTS

CN 101641573 A 2/2010
CN 102455288 A 5/2012
(Continued)

OTHER PUBLICATIONS

Notice of Reasons for Refusal issued for the parallel Japanese patent application No. 2021-570393, dated May 16, 2023, 4 pages (for informational purposes only).
(Continued)

*Primary Examiner* — Allen C. Ho
(74) *Attorney, Agent, or Firm* — VIERING, JENTSCHURA & PARTNER mbB (57) ABSTRACT

An optoelectronic sensor component for measuring light may include a first signal channel, a second signal channel, a first light-sensitive detection assembly, a second light-sensitive detection assembly, a further light-sensitive detection assembly, and an assigned further signal channel. The first signal channel may provide a first electrical signal, which represents the intensity of light incident on the sensor
(Continued)

component. The second signal channel may provide a second electrical signal representing the intensity of the light incident on the sensor component. The first and second light-sensitive detection assemblies may generate the first and second electrical signals, respectively, and be assigned to the first and second signal channels, respectively. Both detection assemblies may have an identical spectral sensitivity and are thus redundant with respect to one another. The spectral sensitivity of both detection assemblies may have a photopic profile. The further light-sensitive detection assembly may be configured for detecting only infrared light.

17 Claims, 4 Drawing Sheets

(58) Field of Classification Search
CPC ......... G01T 1/243; G01T 1/244; G01T 1/245; G01T 1/247
USPC ........ 250/332, 338.1, 338.4, 339.01, 339.02, 250/339.05, 339.11, 339.14, 330
See application file for complete search history.

(56) References Cited

U.S. PATENT DOCUMENTS

| | | | |
|---|---|---|---|
| 7,166,825 B1 | 1/2007 | Smith et al. | |
| 7,388,665 B2* | 6/2008 | Ashdown | G01J 3/51 250/226 |
| 7,649,220 B2* | 1/2010 | Chen | G01N 21/251 257/292 |
| 8,138,463 B2* | 3/2012 | Hadwen | G01J 1/4204 250/214 R |
| 8,269,172 B2* | 9/2012 | Skurnik | H01L 31/02019 250/339.05 |
| 8,274,051 B1* | 9/2012 | Aswell | H01L 31/02162 250/339.05 |
| 8,274,657 B2* | 9/2012 | Jaeger | H01L 31/105 356/402 |
| 8,461,530 B2* | 6/2013 | Findlay | G01J 1/0271 250/338.1 |
| 8,659,804 B2* | 2/2014 | Engholm | H04N 1/047 358/497 |
| 8,779,542 B2* | 7/2014 | Dyer | H01L 27/14625 257/70 |
| 9,001,095 B2* | 4/2015 | Park | G09G 3/20 345/207 |
| 9,083,946 B2* | 7/2015 | Grinberg | H04N 23/56 |
| 9,129,548 B2* | 9/2015 | Zheng | G01J 1/4228 |
| 9,404,795 B2* | 8/2016 | Fant | H01L 27/14623 |
| 9,423,296 B2* | 8/2016 | Müller | G01J 1/4228 |
| 10,006,806 B2* | 6/2018 | Xu | G01J 1/4228 |
| 10,393,577 B2* | 8/2019 | Glover | G01J 1/0492 |
| 10,458,841 B2* | 10/2019 | Jacobs | H01L 31/02162 |
| 10,755,127 B2* | 8/2020 | Mueller | G06V 10/147 |
| 10,827,138 B2* | 11/2020 | Bishop | H04N 25/77 |
| 10,969,272 B2* | 4/2021 | Narendran | G01J 3/505 |
| 11,796,713 B2* | 10/2023 | Send | G01V 8/12 |
| 2002/0053635 A1 | 5/2002 | Schroter | |
| 2008/0239321 A1 | 10/2008 | Chen et al. | |
| 2010/0026192 A1 | 2/2010 | Hadwen et al. | |
| 2010/0108919 A1 | 5/2010 | Sofaly | |
| 2011/0102391 A1 | 5/2011 | Park et al. | |
| 2011/0215724 A1 | 9/2011 | Chakravarty et al. | |
| 2011/0299137 A1 | 12/2011 | Engholm et al. | |
| 2012/0074322 A1 | 3/2012 | Skurnik | |
| 2014/0138784 A1 | 5/2014 | Dyer et al. | |
| 2015/0097105 A1 | 4/2015 | Fant et al. | |
| 2018/0276490 A1 | 9/2018 | Mueller | |
| 2019/0297280 A1 | 9/2019 | Bishop et al. | |

FOREIGN PATENT DOCUMENTS

| | | |
|---|---|---|
| DE | 10046785 A1 | 4/2002 |
| DE | 102008015562 A1 | 10/2008 |
| DE | 102015219496 A1 | 4/2017 |
| EP | 3252445 A1 | 12/2017 |
| JP | H04108098 A | 4/1992 |
| JP | H08159871 A | 6/1996 |
| JP | H1044860 A | 2/1998 |
| JP | H11296756 A | 10/1999 |
| JP | 2002100753 A | 4/2002 |
| JP | 200323172 A | 1/2003 |
| JP | 2005011990 A | 1/2005 |
| JP | 2006118965 A | 5/2006 |
| JP | 2007049493 A | 2/2007 |
| JP | 2008039417 A | 2/2008 |
| JP | 2009068901 A | 4/2009 |
| JP | 2009087961 A | 4/2009 |
| JP | 2010506141 A | 2/2010 |
| JP | 2011100113 A | 5/2011 |
| JP | 2012510221 A | 4/2012 |
| JP | 2012177576 A | 9/2012 |
| JP | 2015051687 A | 3/2015 |
| JP | 201575446 A | 4/2015 |
| JP | 2018124237 A | 8/2018 |
| WO | 2017207639 A1 | 12/2017 |

OTHER PUBLICATIONS

Peter F.I. Scott et al., "Real-time photon beam localization methods using high-resolution imagers and parallel processing using a reconfigurable system", Optical Engineering, Jul. 2009, pp. 073601-1-073601-14, vol. 48(7).

Joe Jablonski et al., "A Turn-Key Calibration Roadmap for Temperature and Radiance from 0.3-14um", SPIE Defense + Security Proceedings, Infrared Imaging Systems: Design, Analysis, Modeling, and Testing XXVIII, Apr. 9-13, 2017, pp. 1017804-1-1017804-16, vol. 10178, Anaheim, United States.

International Search Report issued for the corresponding International patent application No. PCT/EP2020/064678, dated Aug. 17, 2020, 17 pages (for informational purposes only).

German Search Report issued for the corresponding German patent application No. 10 2019 114 537.6, dated Feb. 11, 2020, 8 pages (for informational purposes only).

Notice of Reasons for refusal issued for the corresponding JP patent application No. 2021-570393, dated Jan. 17, 2023, 6 pages (For informational purposes only).

Search Report by registered organization issued for the corresponding JP patent application No. 2021-570393 communicated on Dec. 22, 2022, 17 pages (For informational purposes only).

Chinese office action issued ffor the corresponding Chinese patent application No. 202080039704.3, dated Dec. 15, 2023, 7 pages (for informational purposes only).

German office action issued for the corresponding German patent application No. 11 2020 002 629.9, dated Sep. 26, 2024, 5 paged (for informational purposes only).

* cited by examiner

OPTOELECTRONIC SENSOR COMPONENT FOR MEASURING LIGHT WITH BUILT-IN REDUNDANCY

CROSS-REFERENCE TO RELATED APPLICATION

The present patent application is a national stage entry according to 35 U.S.C. § 371 of PCT application No.: PCT/EP2020/064678 filed on May 27, 2020; which claims the priority of German patent application 10 2019 114 537.6 filed on May 29, 2019, all of which are incorporated herein by reference in their entirety and for all purposes.

TECHNICAL FIELD

The present disclosure relates to optoelectronic sensor components, and in particular ambient light sensors.

BACKGROUND

An ambient light sensor is an integrated optoelectronic sensor that detects the intensity of the ambient light and outputs a signal that is proportional to the ambient light intensity. Known ambient light sensors typically comprise a photodiode assembly and a signal processing circuit.

Ambient light sensors are built into the dashboards of motor vehicles, for example, where they measure the light intensity in the passenger compartment. On the basis of this measurement, the backlighting of the displays of the dashboard can then be adapted accordingly.

In the field of motor vehicles, in particular, sensors used therein are subject to the requirement that they are suitable for integrity checking. This ensures that the function of each sensor can be checked and a sensor that has possibly failed can thus be identified.

Present-day ambient light sensors do not satisfy these requirements.

Furthermore, in the field of motor vehicles, there is the requirement for controlling the display brightness of the displays of the dashboard by way of proximity detection and gesture recognition. This requires a proximity detection function in combination with an ambient light detection function. Proximity measurements can be carried out by proximity sensors. These sensors comprise infrared emitters, which illuminate the target object, and infrared detectors, which measure the signal reflected from said target object. The distance to the target object can be calculated on the basis of the intensity of the reflected signal measured by the sensor.

The function checking that is already employed in the case of discrete photodiode-based detectors might then be considered for being applied to integrated optoelectronic sensors such as ambient light sensors, for instance. Such function checking functions as follows: the supply voltage of the photodiode is reversed. As a result, the photodiode is no longer operated in the reverse direction, but rather in the forward direction. The resulting forward current is measured. If the measured forward current lies within a predefined range, an entirely satisfactory function of the photodiode is deduced.

This integrity check cannot be carried out in the case of integrated optical sensors, however, since there the supply voltage of individual photodiodes cannot be reversed straightforwardly without deactivating the entire integrated circuit.

It would therefore be desirable to have a sensor architecture which enables a different, reliable and simple integrity check, and which moreover is suitable for integrated circuits.

Said architecture should be configured in particular in such a way that it can be implemented in an integrated optoelectronic sensor component such as an ambient light sensor, for instance.

Accordingly, it is desirable to specify an optoelectronic sensor component which enables plausibility or function checking to be carried out in a simple and convenient manner. The function checking should be possible in particular in real time during ongoing operation of the optoelectronic sensor component.

SUMMARY

An optoelectronic sensor component for measuring light may include a first signal channel for providing a first electrical signal, which represents the intensity of light incident on the sensor component, a second signal channel, which is separate from the first signal channel in terms of signaling, for providing a second electrical signal, which is independent of the first electrical signal and which likewise represents the intensity of the light incident on the sensor component, a first light-sensitive detection assembly, which is configured for generating the first electrical signal and is assigned to the first signal channel, and a second light-sensitive detection assembly, which is configured for generating the second electrical signal and is assigned to the second signal channel, wherein both detection assemblies have an identical spectral sensitivity and are thus redundant with respect to one another.

By virtue of two separate detection assemblies being provided, said assemblies having an identical spectral detection sensitivity and thus being redundant with respect to one another, the optoelectronic sensor component yields the same measurement signal twice in the case of an entirely satisfactory function. That can be used for redundancy-based plausibility monitoring. In other words, an additional redundant light-sensitive detection assembly is used to detect the same incident light. Comparison of the mutually redundant signals allows a possible malfunction of the sensor component to be deduced.

In accordance with non-limiting embodiments, the sensor component can have one, a plurality or all of the following features, in all technically possible combinations:
- at least one signal processing circuit for conditioning the first and second electrical signals;
- the two detection assemblies and each signal processing circuit are embodied as a single integrated circuit with a common voltage supply;
- a first signal processing circuit for conditioning the first electrical signal and a separate second signal processing circuit for conditioning the second electrical signal;
- the spectral sensitivity of both detection assemblies has a photopic profile;
- a further light-sensitive detection assembly and an assigned further signal channel, wherein the further detection assembly is configured for detecting, in particular only, infrared light;
- a further light-sensitive detection assembly and an assigned further signal channel, wherein the further detection assembly has an identical spectral sensitivity to the first and second detection assemblies and is shielded vis á vis ambient light, such that it can supply a reference signal for darkness;

each detection assembly comprises at least one photodiode;

a light-sensitive total measurement area subdivided into a number of measurement elements, wherein the measurement elements are formed by the photodiodes of the detection assemblies;

the first detection assembly defines a first light-sensitive measurement area and the second detection assembly defines a second light-sensitive measurement area, wherein the area of the first measurement area is an integral multiple of the area of the second measurement area;

the sensor component is an ambient light sensor.

The further light-sensitive detection assembly and the assigned further signal channel for detecting infrared light can be used for example in applications in which a proximity detection function is also desired alongside the ambient light detection function. For the proximity detection function, for example, an emitter configured to emit, in particular only, infrared light can be used to illuminate a target object. By means of the further light-sensitive detection assembly and the assigned further signal channel for detecting infrared light, the intensity of the infrared light reflected from the target object can be measured in addition to the intensity of the ambient light. The intensity of the reflected light can be used to calculate the distance between the detection assembly and a target object.

Likewise, the further light-sensitive detection assembly and the assigned further signal channel for detecting infrared light can supply a reference signal for infrared light, which reference signal can be subtracted from the signal of the first and second detection assemblies in order to adapt the spectral sensitivity of the two detection assemblies even better to a photopic 25 profile. Accordingly, the spectral sensitivity of the human eye can be modeled in the best possible way. This can be done for example in a manner similar to the determination of a reference signal for dark current, by the infrared signal detected by the detection assembly being subtracted from the signal of the first and second detection assemblies.

A system for measuring light with function checking may include a sensor component having the features mentioned above and a device for checking the function of the sensor component, wherein the function checking device is configured to compare the two electrical signals generated by the first two detection assemblies and to deduce a malfunction of the sensor component (100) depending on the result of the comparison.

The light measuring system may have one, a plurality or all of the following features, all in technically possible combinations:

the comparison effected by the function checking device consists in forming the difference between the two electrical signals generated and deducing a malfunction if the absolute value of the difference exceeds a specific threshold value;

the function checking device is furthermore configured to compare the reference signal with the first two electrical signals and to deduce a malfunction of the sensor component if the absolute value of at least one of the two electrical signals is less than the absolute value of the reference signal.

A system for electronic control based on measuring light may include a sensor component as defined above and an electronic control unit, wherein the sensor component and the control unit are connected to one another via a digital communication interface, such that the sensor component can transmit its measurement results in the form of digital data to the control unit, wherein the system provides a method for checking the error-free data transmission between the sensor component and the control unit, e.g. by means of a checksum, a cyclic redundancy check or an error correction method.

The two systems defined above may be combined in a non-limiting embodiment.

BRIEF DESCRIPTION OF THE DRAWINGS

Various embodiments will now be described in greater detail with reference to the drawings, wherein.

Identical elements, elements of the same kind or elements having the same effect are indicated in the figures with the same reference signs. The figures and the proportions of the elements shown in the figures with respect to one another are not to be regarded as to scale. Rather, individual elements may be shown exaggeratedly large for better representability and/or for better comprehensibility.

DETAILED DESCRIPTION

The various sensor components 100, 200, 300 and 400 shown in the figures are in each case a combined ambient light and proximity sensor. Such sensors yield an output signal which increases with increasing intensity of light L incident on the sensor (see the arrows in the figures). The intensity of the light L prevailing in the environment in which the sensor is situated can thus be measured with the aid of such sensors. In addition, the sensor is also able to detect the approach of a human body part.

Such sensors can be installed in the dashboard of a motor vehicle, for example, where they serve for measuring the lighting conditions prevailing in the passenger compartment. The backlighting of the dashboard displays can then be adapted on the basis of the measurement result. By virtue of the proximity detection, commands issued by an occupant of the vehicle can also be recognized.

Of course, the sensors shown in the figures can also be used in other fields.

Figure 1:
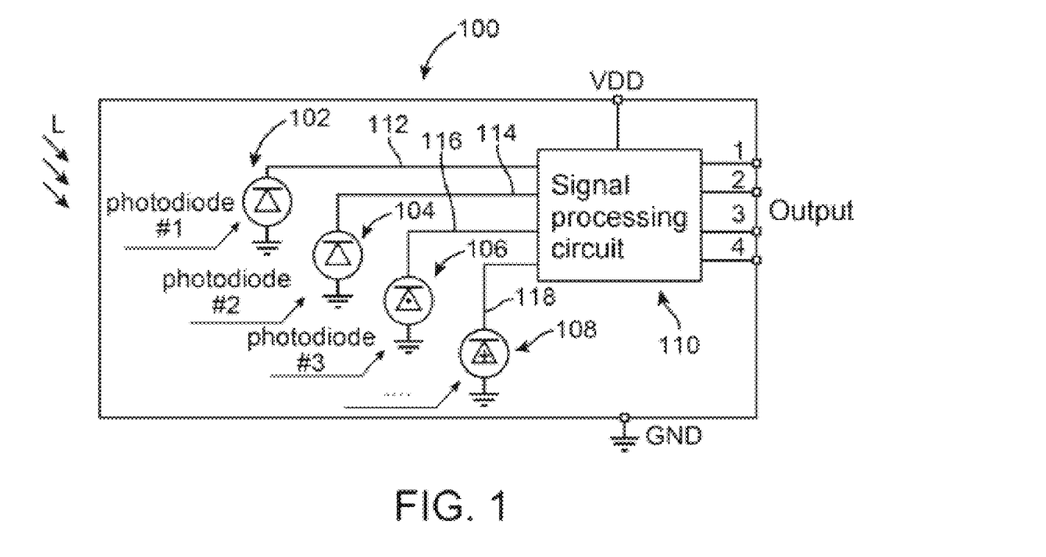
FIG. 1 is a block diagram of a first embodiment of a sensor component comprising one photodiode per channel and a common signal processing circuit.

FIG. 1 is a block diagram of a first embodiment 100 of an optoelectronic sensor component. The sensor component 100 is present in the form of an integrated circuit. The sensor component 100 can be realized as a semiconductor chip, for example. The sensor component 100 comprises four light-sensitive detection assemblies 102, 104, 106 and 108 and a common signal processing circuit 110. The semiconductor chip 100 is supplied with power via a terminal VDD. The chip usually comprises a grounding terminal GND as well.

The chip 100 has four further terminals, numbered consecutively from 1 to 4 in the figure. The semiconductor chip 100 additionally has a measurement area, not illustrated here, for measuring the incident ambient light L. The detection assemblies 102, 104, 106 and 108 are part of the measurement area.

In the present example, each of the four detection assemblies respectively consists of one photodiode 102 to 108. Each respective photodiode 102 to 108 corresponds to a signal channel 112 to 118 for providing an electrical signal. The four signal channels 112, 114, 116 and 118 are each separate from one another in terms of signaling. They each provide an electrical signal that is independent of the other electrical signals.

The first two photodiodes 102 and 104 have an identical spectral sensitivity. They are thus redundant with respect to one another. In other words, they thus yield the same signal for the same incident ambient light L. The spectral sensitivity in the case of the photodiodes 102 and 104 may have a photopic profile. That is to say that the spectral sensitivity of the two detection assemblies 102 and 104 is modeled on that of the human eye.

The third detection assembly 106 has a photodiode having a different spectral sensitivity than that of the first two photodiodes 102 and 104. The photodiode 106 is a photodiode that is sensitive to, in particular only, infrared radiation (IR photodiode). The fact that the photodiode 106 is a different photodiode than the other two photodiodes 102 and 104 is identified by the black dot in the photodiode triangle.

The fourth detection assembly 108 comprises a photodiode of the same type as the first two photodiodes 102 and 104. This means that the spectral sensitivity of the fourth photodiode 108 is identical to that of the photodiodes 102 and 104. The difference, however, is that the fourth photodiode 108 is shielded vis á vis the ambient light L by an opaque cover, for example. This is identified by the cross in the photodiode triangle.

Consequently, the first signal channel 112 represents the intensity of the light L incident on the sensor component 100. Likewise, the second signal channel 114 represents the intensity of the ambient light L incident on the sensor component 100. The third signal channel 116 represents the intensity of the infrared light incident on the sensor component 100. The fourth signal channel 118, by contrast, yields a constant reference signal for darkness.

However, the fourth detection assembly 108 can also have a different spectral sensitivity than that of the photodiodes 102, 104 and 106. Accordingly, besides detection assemblies having a spectral sensitivity having a photopic profile and a spectral sensitivity in the infrared range, the chip 100 can also comprise a detection assembly that is sensitive to other spectral ranges.

All of the photodiodes 102 to 108 are connected to the same signal processing circuit 110. The signal processing circuit 110 thus performs the conditioning of all signals supplied by the photodiodes 102 to 108. This is done serially, for example, such that the signal processing circuit successively converts the signals of the four different photodiodes.

The signal processing circuit 110 typically comprises an amplifier and an analog-to-digital convertor.

Terminal No. 1 is the data output of the chip 100. Via the latter, the signals supplied by the detection assemblies 102, 104, 106 and 108 and processed by the signal processing circuit 110 are output. Terminal No. 2 is a clock input for providing a clock frequency to the chip 100. Terminal No. 3 is a so-called interrupt pin. Via this output, the chip 100 can notify e.g. an external control unit that a great change in the light intensity is taking place. Terminal No. 4 is a so-called address pin. Via this input, e.g. an external control unit can set an address of the sensor, in respect of the fourth photodiode 108.

Figure 2:
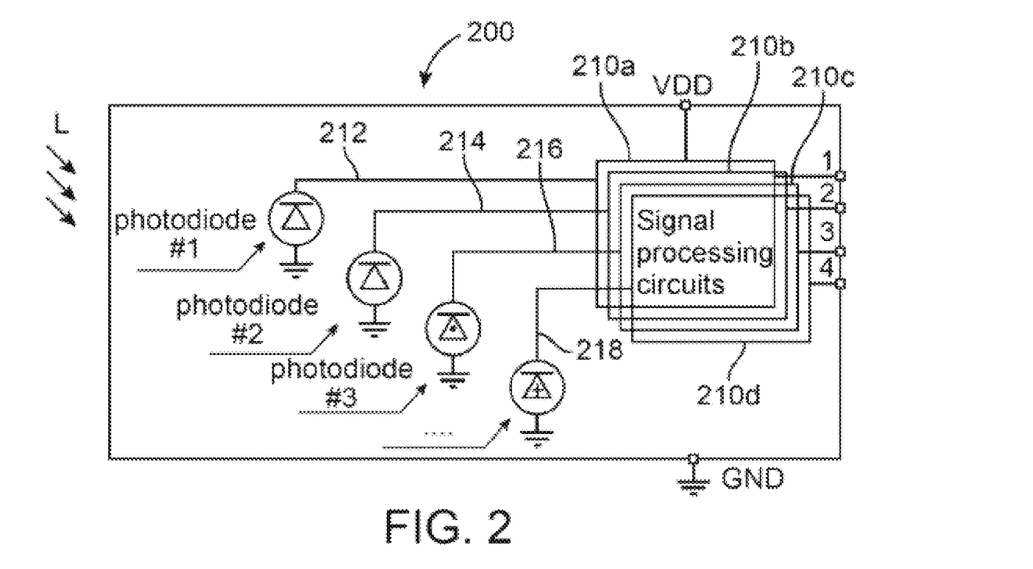
FIG. 2 is a block diagram of a second embodiment of a sensor component comprising one photodiode per channel and one signal processing circuit per channel.

FIG. 2 shows a second embodiment 200 of an optoelectronic sensor component. The sensor component 200 has a construction comparable to that of the sensor component 100 from FIG. 1. It differs merely in that each signal channel 212, 214, 216 and 218 is assigned to a dedicated and separate signal processing circuit 210a to 210d. In the case of the sensor component 200, therefore, the signals of the four different photodiodes 202 to 208 can be processed in parallel and simultaneously. In contrast to the sensor component 100 from FIG. 1, the provision of a respective dedicated signal processing circuit 210a and 210b for the two redundant channels 212 and 214 makes it possible to preclude undesired deviations between the two output signals that may occur as a result of the serial signal processing. Moreover, a defective signal processing circuit can be identified in the case of this second embodiment.

Accordingly, an infrared signal of the photodiode 206 can be measured in parallel with an ambient light signal of the photodiodes 202 and 204.

Figure 3:
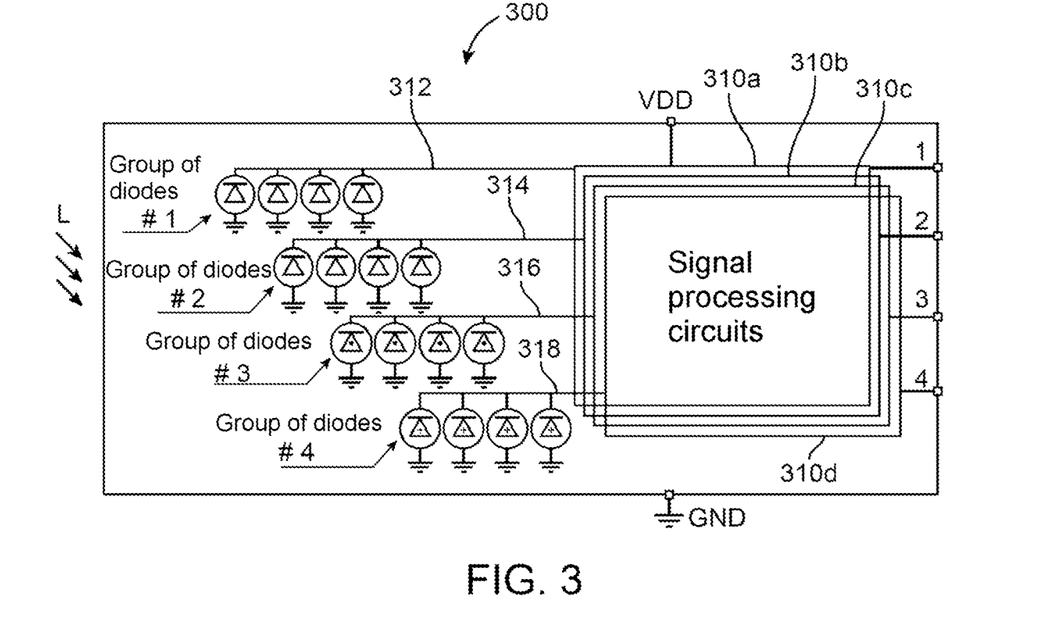
FIG. 3 is a block diagram of a third embodiment of a sensor component comprising four photodiodes per channel.

The block diagram in accordance with FIG. 3 shows a third embodiment 300 of a sensor component. The special feature in the case of this variant is that not just a single photodiode, but rather an entire group of photodiodes is assigned to each of the four channels 312, 314, 316 and 318. In this example, each group of diodes comprises four photodiodes connected in parallel. The provision of a plurality of photodiodes per channel results in a greater signal yield. Moreover, possible slight differences between the characteristic curves of the photodiodes, which can result in undesired deviations between the signals of the two redundant channels when just one photodiode per channel is used, are thus of less significance. Such differences between characteristic curves may be e.g. a consequence of fluctuations in process parameters during fabrication of the photodiodes.

As in the example in FIG. 2, here as well each individual channel 312 to 318 has its dedicated signal processing circuit 310a to 310d.

Figure 4:
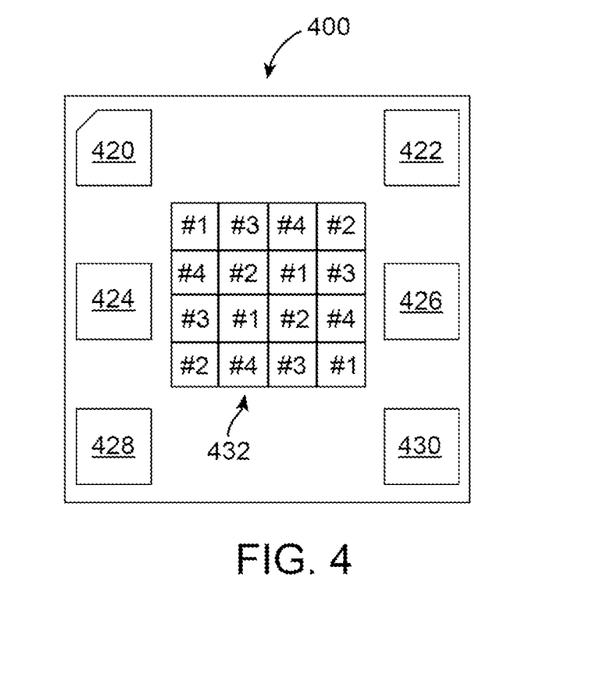
FIG. 4 is a block diagram of one possible hardware implementation of a sensor component in the form of a chip with a measurement area subdivided into individual pixels.

FIG. 4 shows a hardware realization of an optoelectronic sensor component 400. In this embodiment, the sensor component 400 is embodied as an integrated semiconductor chip. The semiconductor chip 400 has six contacts 420, 422, 424, 426, 428 and 430. A total measurement area 432 is formed in the center of the semiconductor chip 400. The total measurement area 432 is the light-sensitive region of the sensor component 400. In the present example, the total measurement area 432 is embodied in square fashion.

The six contacts 420 to 430 frame the total measurement area 432. The contact 420 at the top left serves for supplying voltage to the semiconductor chip 400. The contact 422 at the top right is the data output. The measurement signals supplied by the sensor chip 400 are read out via this contact 422. The contact 422 can be embodied as an I2C interface. The contact 424 in the middle on the left serves for grounding the semiconductor chip 400. The contact 426 in the middle on the right serves for connecting a timer (clock) for the purpose of data transmission e.g. via an I2C interface. The contact 428 at the bottom left serves for addressing. The contact 430 at the bottom right is an interrupt.

The total measurement area 432 is subdivided into a number of individual measurement elements. In the present case, there are 4×4=16 measurement elements. The individual measurement elements are identified by the numbers 1 to 4. The individual, here square, measurement elements each correspond to an individual photodiode.

The number of the measurement element (1 to 4) indicates to which of the four measurement channels of the ambient light sensor 400 the respective measurement element is assigned. In a manner comparable to the example in FIG. 3, four photodiodes are assigned to each measurement channel. The measurement channels 1 and 2 are once again embodied in a redundant fashion. The associated photodiodes have the same spectral sensitivity (e.g. they simulate the sensitivity of the human eye) and serve for detecting the same spectral range. The measurement channel 3 serves for detecting the infrared light. The measurement channel 4 in turn is assigned to four shielded photodiodes that supply the reference signal already mentioned.

The 4×4 photodiodes are distributed on the total measurement area 432 as follows: the redundant photodiodes for measuring ambient light are situated in the corners and in the center of the square total measurement area 432. The photodiodes for reference measurement and for measuring infrared light are arranged centrally on the outer sides of the square total measurement area 432.

This pixel arrangement has the advantage that the geometry is symmetrical. In this regard, there is a shielded and an infrared photodiode on each outer side of the active optical area 432. As a result, the signals are independent of the angle of light incidence.

In other words, the total measurement area 432 is thus subdivided into individual picture elements or pixels.

It was assumed in the description above that the measurement area covered by the photodiode(s) of the first channel and the measurement area covered by the photodiode(s) of the second measurement channel are of identical size. Alternatively, however, one measurement area can also be an integral multiple of the other measurement area.

Figure 5:
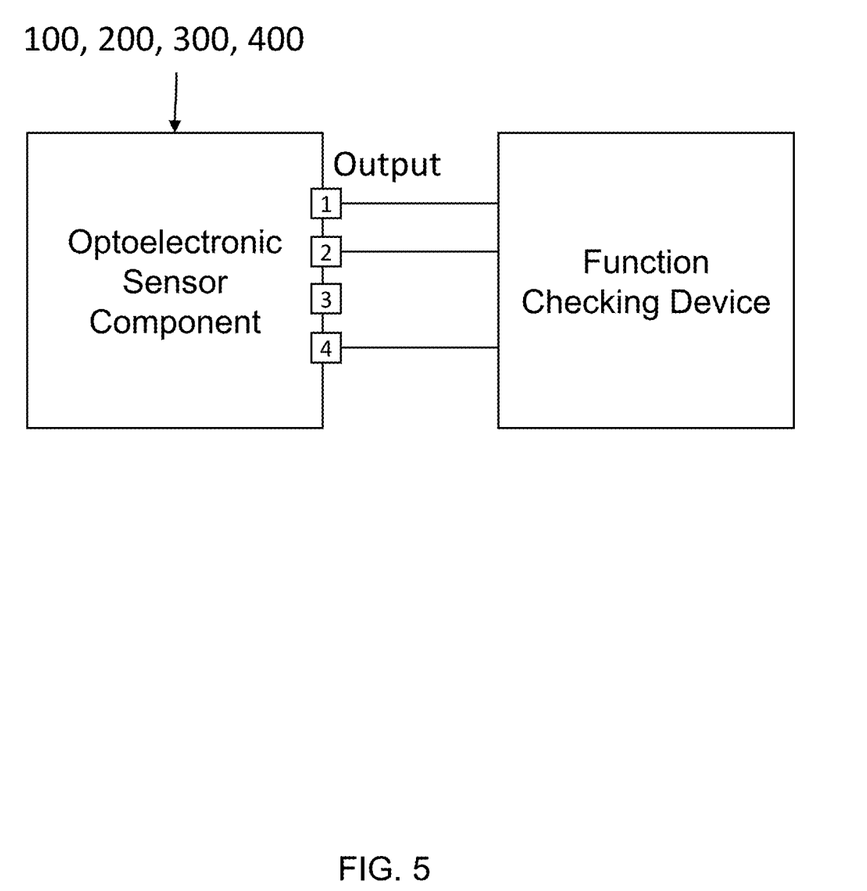
FIG. 5 is a block diagram of a sensor component combined with a function checking device.

FIG. 5 is a block diagram of a sensor component combined with a function checking device. A sensor component can be combined with a function checking device to form a system for measuring light with function checking. The function checking device then reads out the first two channels 1 and 2 of the sensor component. It compares the two signals read out and deduces a malfunction of the sensor component depending on the result of the comparison. The comparison may be effected by forming g the difference between the two signals supplied by the channels. If the absolute value of the difference between the two signals exceeds a specific threshold value, it is assumed that the sensor component is faulty. Since the photodiodes of the first channel and the photodiodes of the second channel are embodied identically, the first two channels should also yield identical signals. If a significant deviation between the two signals occurs, there is thus some evidence that a malfunction of the photodiodes or of the signal processing circuit is present.

In addition, the function checking device can also compare the reference signal supplied by the fourth channel with the signals supplied by the first two channels. Since the associated photodiodes of the fourth channel are covered, the minimum signal expected when there is complete darkness prevailing in the environment of the sensor component is always present at output No. 4 of the sensor component. Accordingly, the absolute value of the signals of the first two channels should always be greater than or equal to that of the reference signal. If the absolute value of at least one of the two signals of the first two channels is less than the absolute value of the reference signal, a malfunction can likewise be assumed.

In the case where the measurement area of the first channel is an integral multiple N of the measurement area of the second channel, the signal I1 supplied by the first channel will be greater than that of the second channel I2 by an integral multiple N. The plausibility value P is then calculated here in accordance with the following equation:

$P = N \times I2 - I1$, wherein N is the integral multiple, I1 is the signal of the first channel, and I2 is the signal of the second channel.

Here, too, a malfunction is deduced if the absolute value of the plausibility value P exceeds a specific threshold value.

The sensor architecture having redundant optical channels can also be used to identify short circuits between the two redundant photodiode channels. For this purpose, a sequential measurement and parallel measurement have to be carried out on both redundant channels. If a short circuit exists between the two photodiode channels, the measurement result of the sequential measurement is double the magnitude of the measurement result of a parallel measurement. In the absence of a short circuit, the same measurement result is expected for both measurements.

Figure 6:
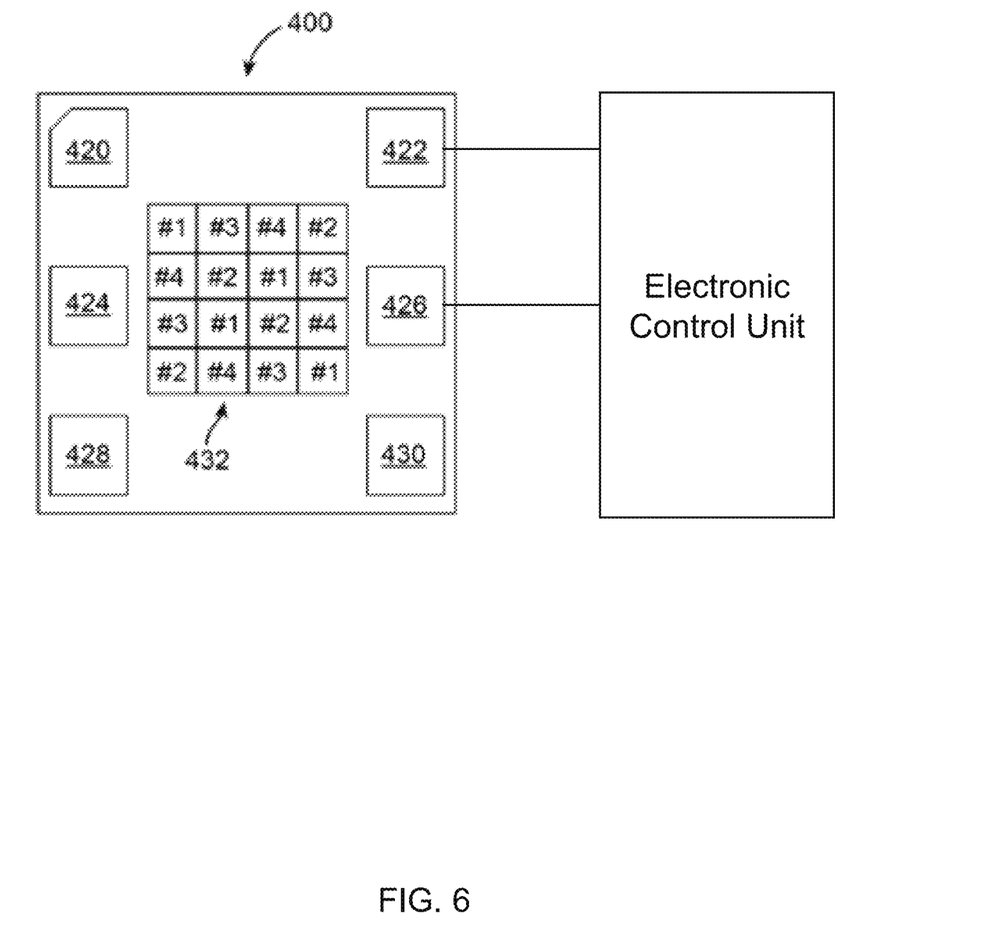
FIG. 6 is a block diagram of a sensor component combined with an electronic control unit.

FIG. 6 is a block diagram of a sensor component combined with an electronic control unit. The sensor component may also be combined with an electronic control unit to form a system for electronic control based on measuring light. The electronic control unit can be a so-called microcontroller (MCU), for example. The sensor component and the control unit are then connected to one another via a digital communication interface. This interface is formed for example by the contact 422 and the contact 426 in FIG. 4. As a result, the sensor component can transmit its measurement results in the form of digital data to the MCU. In this case, provision can be made of a method for checking the error-free data transmission between the sensor component and the MCU, for example by means of a checksum, a cyclic redundancy check or an error correction method.

LIST OF REFERENCE SIGHS 100, 200, 300, 400 Sensor component
102, 104, 106, 108 Light-sensitive detection assembly
110, 210, 310 Signal processing circuit
112, 114, 116, 118 Signal channel
212, 214, 216, 218 Signal channel
312, 314, 316, 318 Signal channel
420 Supply voltage terminal
422 Data output
424 Ground terminal
426 Clock generator terminal
428 Addressing pin
430 Interrupt
432 Total measurement area
L Ambient light

The invention claimed is:

1. An optoelectronic sensor component configured to measure light, comprising:
   a first signal channel configured to provide a first electrical signal, which represents an intensity of light incident on the optoelectronic sensor component;
   a second signal channel separate from the first signal channel in terms of signaling, wherein the second signal channel is configured to provide a second electrical signal independent of the first electrical signal, and wherein the second signal channel represents an intensity of the light incident on the optoelectronic sensor component;

a first light-sensitive detection assembly configured to generate the first electrical signal, and wherein the first light-sensitive detection assembly is assigned to the first signal channel;

a second light-sensitive detection assembly configured to generate the second electrical signal, and wherein the second light-sensitive detection assembly is assigned to the second signal channel;

wherein the first light-sensitive detection assembly and the second light-sensitive detection assembly have an identical spectral sensitivity and are thus redundant with respect to one another, and wherein the identical spectral sensitivity of the first light-sensitive detection assembly and the second light-sensitive detection assembly has a photopic profile;

an assigned third signal channel; and a third light-sensitive detection assembly configured to detect only infrared light.

2. The optoelectronic sensor component as claimed in claim 1, further comprising:

at least one signal processing circuit configured to condition the first electrical signal and the second electrical signal.

3. The optoelectronic sensor component as claimed in claim 2, wherein the first light-sensitive detection assembly, the second light-sensitive detection assembly, and the at least one signal processing circuit are embodied as a single integrated circuit with a common voltage supply.

4. The optoelectronic sensor component as claimed in claim 2, wherein the at least one signal processing circuit comprises:

a first signal processing circuit configured to condition the first electrical signal; and a separate second signal processing circuit configured to condition the second electrical signal.

5. The optoelectronic sensor component as claimed in claim 1, further comprising:

an assigned further signal channel; and a further light-sensitive detection assembly, wherein the further light-sensitive detection assembly has an identical spectral sensitivity to the first light-sensitive detection assembly and the second light-sensitive detection assembly, and is shielded from ambient light, such that the further light-sensitive detection assembly can supply a reference signal for darkness.

6. The optoelectronic sensor component as claimed in claim 1, wherein each light-sensitive detection assembly of the first light-sensitive detection assembly and the second light-sensitive detection assembly comprises at least one photodiode.

7. The optoelectronic sensor component as claimed in claim 6, further comprising:

a light-sensitive total measurement area subdivided into a plurality of measurement elements, wherein the plurality of measurement elements is formed by the at least one photodiode of each light-sensitive detection assembly of the first light-sensitive detection assembly and the second light-sensitive detection assembly.

8. The optoelectronic sensor component as claimed in claim 1, wherein the first light-sensitive detection assembly defines a first light-sensitive measurement area and the second light-sensitive detection assembly defines a second light-sensitive measurement area, and wherein the first light-sensitive measurement area is an integral multiple of the second light-sensitive measurement area.

9. The optoelectronic sensor component as claimed in claim 1, wherein the optoelectronic sensor component is an ambient light sensor.

10. The optoelectronic sensor component as claimed in claim 1, wherein the first light-sensitive detection assembly and the second light-sensitive detection assembly are configured to detect only visible light.

11. A system for measuring light with function checking, wherein the system comprises:

the optoelectronic sensor component as claimed in claim 1; and a function checking device configured to check a function of the optoelectronic sensor component, wherein the function checking device is configured to compare the first electrical signal and the second electrical signal generated from the first light-sensitive detection assembly and the second light-sensitive detection assembly, and to deduce a malfunction of the optoelectronic sensor component based on a result of comparing of the first electrical signal and the second electrical signal.

12. The system as claimed in claim 11, wherein the comparing effected by the function checking device consists in forming a difference between the first electrical signal and the second electrical signal and deducing a malfunction when an absolute value of the difference exceeds a specific threshold value.

13. The system as claimed in claim 11, wherein each light-sensitive detection assembly of the first light-sensitive detection assembly and the second light-sensitive detection assembly comprises at least one photodiode; wherein a plurality of measurement elements is formed by the at least one photodiode of the first light-sensitive detection assembly and the second light-sensitive detection assembly; and where a light-sensitive total measurement area is subdivided based on the plurality of measurement elements; wherein the function checking device is further configured to compare a reference signal with the first electrical signal and the second electrical signal, and configured to deduce a malfunction of the optoelectronic sensor component when an absolute value of at least one of the first and second electrical signals electrical signal and the second electrical signal is less than an absolute value of the reference signal.

14. A system for electronic control based on measuring light comprising;

the optoelectronic sensor component as claimed in claim 1; and an electronic control unit, wherein the optoelectronic sensor component and the electronic control unit are connected to one another via a digital communication interface, such that the optoelectronic sensor component is configured to transmit measurement results in a form of digital data to the electronic control unit, and wherein the system provides a method for checking an error-free data transmission between the optoelectronic sensor component and the electronic control unit.

15. The system as claimed in claim 14, further comprising:

a function checking device configured to check a function of the optoelectronic sensor component, wherein the function checking device is configured to compare the first electrical signal and the second electrical signal generated from the first light-sensitive detection assembly and the second light-sensitive detection assembly, and to deduce a malfunction of the optoelectronic sensor component based on a result of comparing of the first electrical signal and the second electrical signal.

16. The system as claimed in claim 15, wherein the comparing effected by the function checking device consists in forming a difference between the first electrical signal and the second electrical signal generated from the first light-sensitive detection assembly and the second light-sensitive detection assembly, and deducing a malfunction when an absolute value of the difference exceeds a specific threshold value.

17. The system as claimed in claim 15, wherein each light-sensitive detection assembly of the first light-sensitive detection assembly and the second light-sensitive detection assembly comprises at least one photodiode;
   wherein a plurality of measurement elements is formed by the at least one photodiode of the first light-sensitive detection assembly and the second light-sensitive detection assembly; and
   where a light-sensitive total measurement area is subdivided based on the plurality of measurement elements;
   wherein the function checking device is further configured to compare a reference signal with the first electrical signal and the second electrical signal, and configured to deduce a malfunction of the optoelectronic sensor component when an absolute value of at least one of the first electrical signal and the second electrical signal is less than an absolute value of the reference signal.

* * * * *